W. S. ARNOLD.

STEAM ENGINE.

No. 10,707. Reissued Apr. 6, 1886.

Attest:
John Schuman.
W. Sprague

Inventor:
William Saxon Arnold.
by his Att'y
Thos. S. Sprague

N. PETERS, Photo-Lithographer, Washington, D. C.

UNITED STATES PATENT OFFICE.

WILLIAM SAXON ARNOLD, OF CHATHAM, ONTARIO, CANADA.

STEAM-ENGINE.

SPECIFICATION forming part of Reissued Letters Patent No. 10,707, dated April 6, 1886.

Original No. 310,489, dated January 6, 1885. Application for reissue filed December 23, 1885. Serial No. 186,571.

*To all whom it may concern:*

Be it known that I, WILLIAM SAXON ARNOLD, a citizen of Canada, residing at Chatham, in the county of Kent and Province of Ontario, Canada, have invented certain new and useful Improvements in Steam-Engines, of which the following is a description.

This invention relates to improvements in steam-engines in which steam is used expansively, and the crank is used as a medium for converting the reciprocating motion of the piston into the rotary motion of the crank-shaft.

In engines using steam expansively by cutting off early in their stroke, the pressure is greatly reduced in the cylinder soon after cutting off and before the crank is in the best position for work; and the objects of my improvements are, first, to apply the power which is transmitted through the piston to the crank when said crank is in a more advantageous position to transmit power than with the present practice; second, I avoid compression on exhaust side of cylinder, and thereby prevent accidents from the accumulation of water. I attain these objects by the mechanism illustrated in the accompanying drawings, in which—

Figure 1:
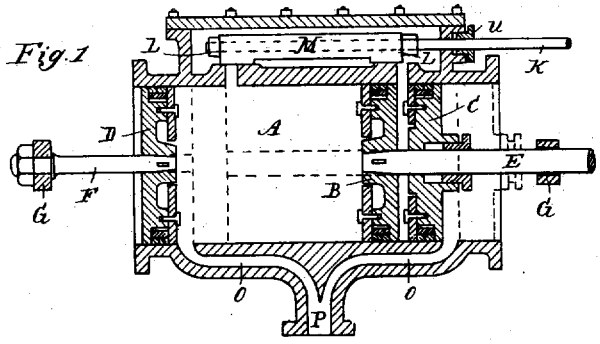
Figure 2:
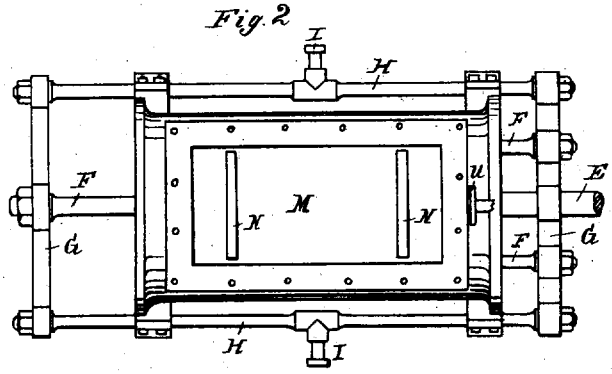
Figure 3:
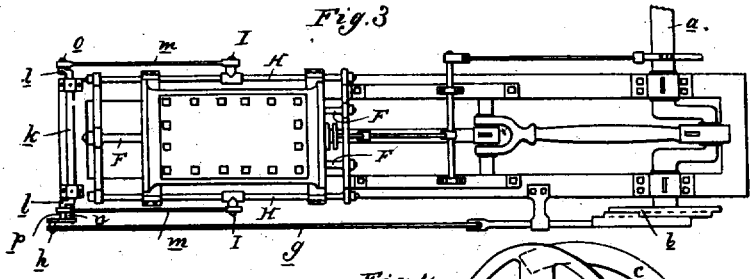
Figure 5:
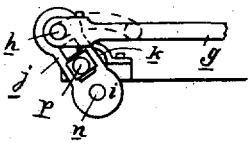
Figure 4:
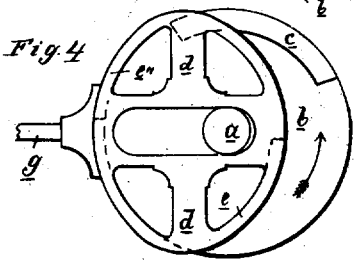

Figure 1 is a longitudinal section of a cylinder, steam-chest, and pistons. Fig. 2 is a top view of cylinder, steam-chest, side bars, cross-head, and piston-rods as they appear after the removal of steam-chest cover and valve. Fig. 3 is a plan of the entire engine. Fig. 4 is an enlarged scale side elevation of the cam motion. Fig. 5 is an enlarged elevation of the slotted rocking lever with its sliding block, wrist-pins, and connecting-rod.

Similar letters refer to similar parts throughout the several views.

Cylinder A, with the steam-chest M, steam-ports N, exhaust-ports O, and exhaust-pipe P constitute the cylinder proper of the engine. The cylinder is provided with three pistons, the center one being the main piston B, and is connected to the main piston-rod E, which transmits power to the crank with the usual connections. The movable piston-heads C and D are externally connected to each other by means of the end piston-rods, F F F, cross-heads G G, and side bars, H H. The side bars, H H, are provided with wrist-pins I I, to which connecting-rods *m m* are attached, that have a reciprocating motion adapted to the time and travel of the piston-heads C D. The slide-valve L controls the admission of steam only, and through its valve rod K is operated by any suitable system of expansion-gear. The exhaust-ports O O are so situated in the bottom of the cylinder that the piston-heads C D in their travel control the exit of steam. In the center of the piston-head C is an ordinary stuffing-box, U, through which the main piston-rod E passes. When in operation, the main piston B makes a portion of its stroke before steam is admitted to the cylinder, the piston-heads C D having simultaneously traveled the same distance and in the same direction, then stop, and are firmly held in place. This position is shown in the drawings, Fig. 1, the dotted lines designating the reverse position of main piston and piston-heads. The exhaust-port O being uncovered by piston-head D and steam then admitted by the steam-valve L, the main piston B continues the remainder of its stroke.

The piston-heads C D are held in position and operated as follows: On the main crank-shaft *a* is secured the disk *b*, on which is a segmental projection, *c*. Against the face of the disk *b*, and free to slide across the diameter of shaft *a*, is the plate *d*, which is provided with two segmental projections, *e e″*. To the plate *d* is attached one end of the rod *g*, the other end connecting with the pin *h*. This pin *h* projects from the side of the upper end of a slotted rocking lever, *i*, the lower end of the rocking lever being pivoted from the bed-plate of engine by the pivot *n*. Across the end of the engine bed-plate farthest from the shaft *a* is journaled the small crank-shaft *k*, said crank-shaft being provided at each end with cranks *l l* and wrist-pins *o p*. From pins *o p* are connecting-rods *m m*, which connect with wrist-pins I I on the side bars, H H. The wrist pin *p* is extended through the sliding block *j*, the said block being free to slide in the slot of the rocking lever *i*. When the main piston B is at that end of the cylinder nearest the main shaft, the projection *c* on disk *b* comes in contact with the projection *e″* on the plate *d*, thereby causing the plate *d* to move toward the cylinder. This motion is transmitted to the rocking lever *i* by the connecting-rod *g*. The said lever *i* will, therefore, through the medium of the sliding block *j* and extended wrist-pin *p*, throw the crank-shaft *k* one-half revolution, and thus (as the wrist-pins *o p* and I I are connected by the rods *m m*) give proper motion to the piston-heads C D. When the end of the projection *c* on the disk *b* ceases its contact with the end of the projection *e''* on the plate *d*, the outer circumference of the projection *c* revolves against the inner circumference of the projection *e''*, and thereby prevents motion in the plate *d* until the projection *c* comes in contact with the lower projection, *e*, on the plate *d*. At the point where the segmental projection *c* on the disk *b* ceases its contact with the end of the projection *e''* on the plate *d*, the outer circumference of the projection *c* revolves against the inner circumference of the projection *e''*, and thereby prevents motion in the plate *d* until the projection *c* comes in contact with the lower projection, *e*, on the plate *d*. At the point where the segmental projection *c* on the disk *b* ceases its contact with the end of the projection *e''* the cranks *l l* have been thrown to their opposite extremes, and the piston-heads C D have reached the extent of their travel and are held rigid in place, owing to the position of the cranks *l l*. It is at this point steam is admitted to the cylinder. The return-stroke is performed in a similar manner to the foregoing by the segmental projection *c* on the disk *b* coming in contact with the lower projection, *e*, on the plate *d*.

It will be seen that the pistons D C form in reality movable cylinder-heads, and exercise none of the functions of the working-piston of an engine, which in this case is the piston B. Therefore my invention has no reference to such engines having a plurality of pistons. The function of the piston cylinder-heads D C is to take up part of the steam-space on the admission side before steam is admitted, so as to apply the whole power of the steam while the working-piston is in an advantageous position to transmit it.

I am aware that prior to my invention steam-engines have been made with more than one piston and with separate steam and exhaust ports, and I therefore do not claim such a combination, broadly.

What I claim as my invention is—

1. In a steam-engine, a cylinder having independent steam and exhaust ports and a steam-space shorter than the stroke of the piston, combined with two movable piston-heads reciprocatingly actuated so as to prevent the formation of a steam-space on the steam side of the piston during the initial portion of the stroke, and to alternately close and open each exhaust-port, substantially as described.

2. In a steam-engine having separate steam and exhaust ports, the combination of the cylinder, movable piston cylinder-heads, a sliding frame by which these piston cylinder-heads are carried, and suitable connections with the crank-shaft for reciprocating said sliding frame to cause said piston-heads to alternately close and open each exhaust-port, substantially as described.

3. In a steam-engine having a cylinder provided with independent steam and exhaust ports, and the steam-space of which is shorter than the stroke of the piston, and is formed between movable piston-heads, a sliding frame to which said piston-heads are secured, and by means of which they are moved at the beginning of each stroke to translate the steam-space of the cylinder the necessary distance to accommodate it to the stroke of the piston and to alternately close and open each exhaust-port, substantially as specified.

4. In an engine having independent steam and exhaust ports, substantially as described, the combination of the movable piston-heads D C, the sliding frame to which they are secured, of suitable connection with the engine for reciprocating said sliding frame to cause said piston-heads to alternately close and open each exhaust-port, and of a crank-motion in said connection which stops on its centers so as to lock the sliding frame, all substantially as described.

5. In an engine substantially as described, the combination of the movable piston-heads D C, the reciprocating sliding frame by which they are carried, the wrists I, the rock-shaft *k*, operated by the engine, the cranks *l* on said rock-shaft, and the links *m*, all substantially as described.

6. The combination, in a steam-engine, with the movable piston-heads C D, and the rods H and cross-heads G, connecting the same, of the crank-shaft *a*, disk *b*, having projection *c*, the plate *d*, with projections *e e''*, the crank-shaft *k*, and connection between the cranks *a k*, substantially as and for the purpose specified.

7. The combination, in a steam-engine, of the side bars, H H, provided with wrist-pins I I, the cross-heads G G, carried by said side bars, the piston-rods F F F, secured to cross-heads G G, the piston heads C D, secured to piston-rods F F F, all having an intermitting reciprocating motion derived from and operated by the mechanism consisting of the disk *b*, with its projection *c*, said disk being secured to the shaft *a*, the plate *d*, with its projections *e e''*, the rod *g*, which connects the plate *d* to the upper end of the slotted rocking lever *i*, the sliding block *j*, the wrist-pins *o p*, the cranks *l l*, the crank-shaft *k*, and the connecting-rods *m m*, which connect the wrist-pins *o p* with the wrist-pins I I on the side bars, H H, all substantially as described, and for the purposes specified.

8. In a steam-engine cylinder, the combination of the movable piston-heads C D with the steam-ports N N, a valve, M, a piston, B, moving independently of the piston-heads C D, and the independent exhaust-ports O O, substantially as shown, and for the purposes specified.

WILLIAM SAXON ARNOLD.

Witnesses:
H. S. SPRAGUE,
CHARLES J. HUNT.